US011841479B2

(12) United States Patent
Cheng et al.

(10) Patent No.: US 11,841,479 B2
(45) Date of Patent: Dec. 12, 2023

(54) SYSTEMS AND METHODS FOR IDENTIFYING SUBSURFACE FEATURES AS A FUNCTION OF POSITION IN A SUBSURFACE VOLUME OF INTEREST

(71) Applicants: CHEVRON U.S.A. INC., San Ramon, CA (US); THE TEXAS A&M UNIVERSITY SYSTEM, College Station, TX (US)

(72) Inventors: Shuxing Cheng, Houston, TX (US); Zhao Zhang, Houston, TX (US); Kellen Leigh Gunderson, Houston, TX (US); Reynaldo Cardona, Houston, TX (US); Zhangyang Wang, College Station, TX (US); Ziyu Jiang, College Station, TX (US)

(73) Assignees: CHEVRON U.S.A. INC., San Ramon, CA (US); THE TEXAS A&M UNIVERSITY SYSTEM, College Station, TX (US)

( * ) Notice: Subject to any disclaimer, the term of this patent is extended or adjusted under 35 U.S.C. 154(b) by 681 days.

(21) Appl. No.: 16/945,517

(22) Filed: Jul. 31, 2020

(65) Prior Publication Data

US 2022/0035069 A1 Feb. 3, 2022

(51) Int. Cl.
*G01V 99/00* (2009.01)
*G06F 111/10* (2020.01)
*G06F 18/214* (2023.01)

(52) U.S. Cl.
CPC .......... *G01V 99/005* (2013.01); *G06F 18/214* (2023.01); *G06F 2111/10* (2020.01); *G06F 2218/08* (2023.01)

(58) Field of Classification Search
CPC ... G01V 99/005; G06F 30/27; G06F 2111/10; G06K 9/00523; G06K 9/6256

(Continued)

(56) References Cited

U.S. PATENT DOCUMENTS 9,940,577 B2 4/2018 Jin et al.
9,952,594 B1 4/2018 Zhao et al.
(Continued)

FOREIGN PATENT DOCUMENTS

CN 102037380 B 5/2013
CN 106814393 A 6/2017
(Continued)

OTHER PUBLICATIONS

Leahy et al., "Coditioning geomodels to siesmic data: a streamlined interpretation workflow," First Break, vol. 32, Mar. 2014, pp. 111-116.

(Continued)

*Primary Examiner* — John E Johansen
(74) *Attorney, Agent, or Firm* — Sheppard, Mullin, Richter & Hampton LLP

(57) ABSTRACT

Systems and methods are disclosed for identifying subsurface features as a function of position in a subsurface volume of interest. Exemplary implementations may include obtaining target subsurface data; obtaining a conditioned subsurface feature model; applying the conditioned subsurface feature model to the target subsurface data, which may include generating convoluted target subsurface data by convoluting the target subsurface data; generating target subsurface feature map layers by applying filters to the convoluted target subsurface data; detecting potential target subsurface features in the target subsurface feature map layers; masking the target subsurface features; and estimating target subsurface feature data by linking the masked subsurface features to the target subsurface feature data.

20 Claims, 8 Drawing Sheets

(58) Field of Classification Search
USPC .................................................... 703/2, 10
See application file for complete search history.

(56) References Cited

U.S. PATENT DOCUMENTS

| | | | |
|---|---|---|---|
| 9,953,236 | B1 | 4/2018 | Huang et al. |
| 10,147,193 | B2 | 12/2018 | Huang et al. |
| 10,303,522 | B2 | 5/2019 | Zhou et al. |
| 10,303,956 | B2 | 5/2019 | Huang et al. |
| 10,308,242 | B2 | 6/2019 | Lin et al. |
| 10,311,312 | B2 | 6/2019 | Yu et al. |
| 10,360,257 | B2 | 7/2019 | Hou et al. |
| 10,387,736 | B2 | 8/2019 | Wang et al. |
| 10,410,055 | B2 | 9/2019 | Wang et al. |
| 2017/0011291 | A1 | 1/2017 | Jin et al. |
| 2017/0139078 | A1 | 5/2017 | Knight et al. |
| 2018/0158552 | A1 | 6/2018 | Liu et al. |
| 2019/0064378 | A1 | 2/2019 | Liu et al. |
| 2019/0162868 | A1 | 5/2019 | Salman et al. |
| 2019/0170888 | A1 | 6/2019 | Halpert et al. |
| 2019/0179983 | A1 | 6/2019 | Prochnow et al. |
| 2019/0302295 | A1* | 10/2019 | Hoversten ................ G01V 1/50 |
| 2019/0324166 | A1 | 10/2019 | Lolla et al. |
| 2020/0183032 | A1 | 6/2020 | Liu et al. |
| 2020/0349414 | A1* | 11/2020 | Bazhenov ............ G06F 18/256 |
| 2021/0041596 | A1 | 2/2021 | Kushwaha et al. |
| 2021/0293983 | A1 | 9/2021 | Wei et al. |
| 2021/0372258 | A1* | 12/2021 | Kazemi Nojadeh ...... E21B 7/04 |
| 2021/0396134 | A1 | 12/2021 | Al Kawai et al. |

FOREIGN PATENT DOCUMENTS

| | | |
|---|---|---|
| CN | 109840660 A | 6/2019 |
| FR | 3032532 A1 | 8/2016 |
| WO | 2019040288 A1 | 2/2019 |

OTHER PUBLICATIONS

Mukhopadhyay et al., "Bayesian deep learning for seismic facies classification and its uncertainty estimation," SEG International Exposition and 89th Annual Meeting (2019), pp. 2488-2492.

Pochet et al., "Seismic Fault Detection Using Convolution Neural Networks Trained on Synthetic Poststacked Amplitude Maps," IEEE Geoscience and Remote Sensing Letters, vol. 16, No. 3, Mar. 2019, pp. 352-356.

Zhang et al., "Seismic Facies Analysis Based on Deep Learning," IEEE Geoscience and Remote Sensing Letters, vol. 17, No. 7, Jul. 2020, pp. 1119-1123.

International Search Report and Written Opinion dated Nov. 17, 2021 for International Application No. PCT/US2021/043900, filed Jul. 30, 2021.

International Search Report and Written Opinion dated Nov. 15, 2021 for International Application No. PCT/US2021/043909, filed Jul. 30, 2021.

Non-final Office Action dated Feb. 6, 2023 for U.S. Appl. No. 16/945,486, filed Jul. 31, 2020.

* cited by examiner

SYSTEMS AND METHODS FOR IDENTIFYING SUBSURFACE FEATURES AS A FUNCTION OF POSITION IN A SUBSURFACE VOLUME OF INTEREST

FIELD OF THE DISCLOSURE

The present disclosure relates to systems and methods for identifying subsurface features as a function of position.

SUMMARY

Implementations of the present disclosure are directed to systems and methods for identifying subsurface features as a function of position. One aspect of the present disclosure relates to a computer-implemented method for identifying subsurface features as a function of position in a subsurface volume of interest. The computer-implemented method may include a computer system. The computer system may include a physical computer processor and a non-transitory storage medium. The computer-implemented method may include obtaining target subsurface data may include a subsurface energy value. The computer-implemented method may also include obtaining target subsurface data may include a subsurface energy value. The computer-implemented method may include obtaining a conditioned subsurface feature model may include a conditioned subsurface feature extraction sub-model, a conditioned subsurface object detection sub-model, and multiple conditioned network sub-models. The conditioned subsurface feature model may have been generated by applying an initial subsurface feature model to training subsurface data and training subsurface feature data. The training subsurface data may include subsurface energy values. The training subsurface feature data may include the training structural identification values defined by structural identification parameters and corresponding training categorization values defined by categorization parameters and one of the training structural identification values. The computer-implemented method may also include applying the conditioned subsurface feature model to the target subsurface data by generating convoluted target subsurface data by convoluting the target subsurface data. Applying the conditioned subsurface feature model to the target subsurface data may include generating target subsurface feature map layers by applying filters to the convoluted target subsurface data. A given target subsurface feature map layer corresponds to a given spatial scale of the target subsurface data. Applying the conditioned subsurface feature model to the target subsurface data may include detecting potential target subsurface features in the target subsurface feature map layers. Applying the conditioned subsurface feature model to the target subsurface data may include masking the target subsurface features. Applying the conditioned subsurface feature model to the target subsurface data may include estimating target subsurface feature data by linking the masked subsurface features to the target subsurface feature data.

In implementations, the computer system may include a display. The computer-implemented method may further include generating a representation of geological structures as a function of position in the subsurface volume of interest using visual effects to depict at least some of the target subsurface feature data. The computer-implemented method may also include displaying the representation.

In implementations, the target subsurface feature data may include a target structural identification value defined by structural identification parameters and a corresponding target categorization value defined by categorization parameters and the target structural identification value.

In implementations, the target structural identification values may indicate whether or not there is a subsurface feature.

In implementations, the target categorization values may indicate one of a subsurface feature category and a subsurface feature sub-category.

In implementations, the conditioned subsurface feature model may include an adversarial loss function defined by $$\min_{f_D, f_F} L_D(f_D(f_F(X)), Y_D) - w L_G(f_G(f_F(X)), Y_G)$$

where $f_D$ may refer to the initial object detection sub-model, $f_F$ may refer to the initial feature extraction sub-model, $Y_D$ may refer to a ground truth for detection, $L_D$ may refer to the cross-entropy loss, $f_G$ may refer to the initial network sub-models, $L_G$ may refer to the geometrical location classification loss, $Y_G$ may refer to the ground truth of geometrical locations, and $w$ may refer to a weight.

In implementations, convoluting the target subsurface data may include applying a kernel to the target subsurface data. The kernel may be a weighted matrix moved over the target subsurface data to generate dot products over each region covered by the weighted matrix.

One aspect of the present disclosure relates to a computer-implemented method for training a subsurface feature model to identify subsurface features as a function of position in a subsurface volume of interest. The computer-implemented method may be implemented in a computer system. The computer system may include a physical computer processor and a non-transitory storage medium. The computer-implemented method may include obtaining training subsurface data may include a subsurface energy value and corresponding training subsurface feature data. The training subsurface feature data may include a training structural identification value defined by structural identification parameters and a corresponding training categorization value defined by categorization parameters and the training structural identification value. The computer-implemented method may also include obtaining an initial subsurface feature model may include an adversarial loss function. The initial subsurface feature model may include an initial subsurface feature extraction sub-model, an initial subsurface object detection sub-model, and multiple initial network sub-models. The computer-implemented method may include generating a conditioned subsurface feature model by training the initial subsurface feature model using the training subsurface data, the training subsurface feature data, and the adversarial loss function. The conditioned subsurface feature model may include a conditioned subsurface feature extraction sub-model, a conditioned subsurface object detection sub-model, and multiple conditioned network sub-models. The computer-implemented method may also include storing the conditioned subsurface feature model in the non-transitory storage medium.

In implementations, the computer-implemented method may further include obtaining target subsurface data may include a subsurface energy value. The computer-implemented method may include applying the conditioned subsurface feature model to the target subsurface data by generating target subsurface feature map layers by convoluting the target subsurface data. A given target subsurface feature map layer corresponds to a given spatial scale of the target subsurface data. Applying the conditioned subsurface feature model to the target subsurface data may include detecting potential target subsurface features in the target subsurface feature map layers. Applying the conditioned subsurface feature model to the target subsurface data may also include classifying the detected target subsurface features. Applying the conditioned subsurface feature model to the target subsurface data may include linking the classified subsurface features to the target subsurface feature data.

In implementations, the computer system may include a display. The computer-implemented method may further include generating a representation of geological structures as a function of position in the subsurface volume of interest using visual effects to depict at least some of the target subsurface feature data. The computer-implemented method may include displaying the representation.

In implementations, the target subsurface feature data may include a target structural identification value defined by structural identification parameters and a corresponding target categorization value defined by categorization parameters and the target structural identification value.

In implementations, the target structural identification values may indicate whether or not there is a subsurface feature.

In implementations, the target categorization values may indicate one of a subsurface feature category and a subsurface feature sub-category.

In implementations, the adversarial loss function may be $$\min_{f_D, f_F} L_D(f_D(f_F(X)), Y_D) - \mathcal{W} L_G(f_G(f_F(X)), Y_G)$$

where $f_D$ may refer to the initial object detection sub-model, $f_F$ may refer to the initial feature extraction sub-model, $Y_D$ may refer to a ground truth for detection, $L_D$ may refer to the cross-entropy loss, $f_G$ may refer to the initial network sub-models, $L_G$ may refer to the geometrical location classification loss, $Y_G$ may refer to the ground truth of geometrical locations, and $\mathcal{W}$ may refer to a weight.

One aspect of the present disclosure relates to a system for identifying subsurface features as a function of position in a subsurface volume of interest. The system may include a non-transitory storage medium and a physical computer processor. The physical computer processor may be configured by machine readable instructions to perform a number of operations. One operation may include obtaining target subsurface data may include a subsurface energy value. Yet another operation may include obtaining a conditioned subsurface feature model may include a conditioned subsurface feature extraction sub-model, a conditioned subsurface object detection sub-model, and multiple conditioned network sub-models. The conditioned subsurface feature model may have been generated by applying an initial subsurface feature model to training subsurface data and training subsurface feature data. The training subsurface data may include subsurface energy values. The training subsurface feature data may include the training structural identification values defined by structural identification parameters and corresponding training categorization values defined by categorization parameters and one of the training structural identification values. One operation may include applying the conditioned subsurface feature model to the target subsurface data by generating target subsurface feature map layers by convoluting the target subsurface data. A given target subsurface feature map layer corresponds to a given spatial scale of the target subsurface data. Applying the conditioned subsurface feature model to the target subsurface data may include detecting potential target subsurface features in the target subsurface feature map layers. Applying the conditioned subsurface feature model to the target subsurface data may include classifying the detected target subsurface features. Applying the conditioned subsurface feature model to the target subsurface data may include linking the classified subsurface features to the target subsurface feature data.

In implementations, the system further may include a display. Another operation may include generating a representation of geological structures as a function of position in the subsurface volume of interest using visual effects to depict at least some of the target subsurface feature data. One operation may include displaying the representation.

In implementations, the subsurface feature model may include one of a mask R-CNN network, a feature pyramids network, an object detection network, a neural network, a random forest model, a support vector machine, a regression, and a Bayesian network.

In implementations, the adversarial loss function may be $$\min_{f_D, f_F} L_D(f_D(f_F(X)), Y_D) - \mathcal{W} L_G(f_G(f_F(X)), Y_G)$$

where $f_D$ may refer to the initial object detection sub-model, $f_F$ may refer to the initial feature extraction sub-model, $Y_D$ may refer to a ground truth for detection, $L_D$ may refer to the cross-entropy loss, $f_G$ may refer to the initial network sub-models, $L_G$ may refer to the geometrical location classification loss, $Y_G$ may refer to the ground truth of geometrical locations, and $\mathcal{W}$ may refer to a weight.

In implementations, the target subsurface feature data may include a target structural identification value defined by structural identification parameters and a corresponding target categorization value defined by categorization parameters and the target structural identification value.

In implementations, convoluting the target subsurface data may include applying a kernel to the target subsurface data. The kernel may be a weighted matrix moved over the target subsurface data to generate dot products over each region covered by the weighted matrix.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as limiting. As used in the specification and in the claims, the singular form of "a", "an", and "the" include plural referents unless the context clearly dictates otherwise. The use of "angle" or "angles" is to be synonymous with "offset," unless the context clearly dictates otherwise.

The technology disclosed herein, in accordance with one or more various implementations, is described in detail with reference to the following figures. The drawings are provided for purposes of illustration only and merely depict typical or example implementations, of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Figure 1:
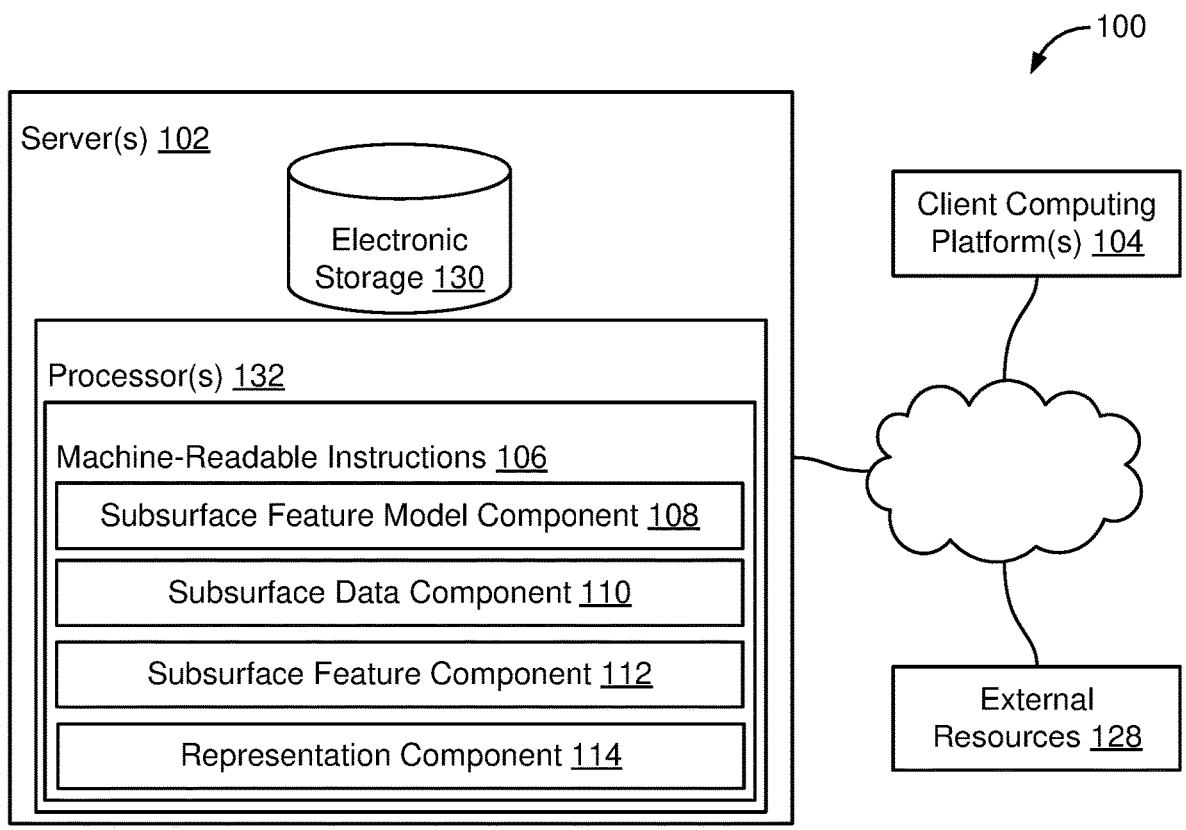
FIG. 1 illustrates a system for identifying subsurface features as a function of position in a subsurface volume of interest, in accordance with one or more implementations.

Existing approaches for identifying subsurface features in a subsurface volume of interest struggle with handling the significant volume of geophysical data now available. Traditional techniques also either require subjective analysis or are narrowly tailored to generate binary results. For example, while subject matter experts may be able to identify whether or not a structural feature is in seismic data, it will not also provide information indicating why it identified a structure feature, or why it did not identify a structural feature.

Disclosed are systems and methods for identifying subsurface features as a function of position in a subsurface volume of interest. Position may refer to a 1D, 2D, and/or 3D space. The presently disclosed technology can generate estimates of subsurface features as a function of position in a subsurface volume of interest based on subsurface data. For example, the presently disclosed technology may use machine learning techniques (e.g., object identification, mask-RCNN, feature pyramid, and so on) to train a model using training data. The trained model can be applied to actual subsurface data to generate subsurface feature data that identifies what subsurface features are in the actual subsurface data. Accordingly, the presently disclosed technology may be used to generate subsurface feature data that can be used by geologists to better interpret the subsurface data.

The subsurface volume of interest may refer to practically anything under a surface. For example, the subsurface volume of interest may be practically anything under a terrestrial surface (e.g., practically anything under a land surface), practically anything under a seafloor, etc. A water column may be above the subsurface volume of interest, for example, in marine hydrocarbon exploration, in marine hydrocarbon recovery, etc. The subsurface volume of interest may be onshore in some implementations. Alternatively, the subsurface volume of interest may be offshore, with shallow water or deep water above the subsurface volume of interest, in some implementations. The subsurface volume of interest may include faults, fractures, overburdens, underburdens, salts, salt welds, rocks, sands, sediments, pore space, etc. The subsurface volume of interest may include practically any geologic point or volume of interest (such as a survey area).

The subsurface volume of interest may also include hydrocarbons, such as liquid hydrocarbons (also known as oil or petroleum), gas hydrocarbons (e.g., natural gas), solid hydrocarbons (e.g., asphaltenes or waxes), a combination of liquid hydrocarbons, gas hydrocarbons, and solid hydrocarbons, etc. Light crude oil, medium oil, heavy crude oil, and extra heavy oil, as defined by the American Petroleum Institute (API) gravity, are examples of hydrocarbons. Indeed, examples of hydrocarbons are many, and may include, oil, natural gas, kerogen, bitumen, clathrates (also referred to as hydrates), etc. The subsurface volume of interest may be known to include hydrocarbons in some implementations. However, the subsurface volume of interest may not be known to include hydrocarbons, such as during hydrocarbon exploration, in other implementations.

The subsurface volume of interest, the hydrocarbons, or any combination thereof may also include non-hydrocarbon items. For example, non-hydrocarbon items may include connate water, brine, tracers, items used in enhanced oil recovery or other hydrocarbon recovery processes, items from other types of treatments (e.g., gels used in conformance control), etc.

In short, each subsurface volume of interest may have a variety of characteristics, such as petrophysical rock properties, reservoir fluid properties, reservoir conditions, or any combination thereof. For example, each subsurface volume of interest may be associated with at least one of: subsurface feature, subsurface property, temperature, porosity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, coalbed methane, a methane hydrate containing subsurface volume of interest, a mineral containing subsurface volume of interest, a metal containing subsurface volume of interest, a subsurface volume of interest having a permeability in the range of 0.01 microdarcy to 10 millidarcy, a subsurface volume of interest having a permeability in the range of 10 millidarcy to 40,000 millidarcy, etc.

Subsurface data may include subsurface energy values. The subsurface energy values may be the data collected and/or measured by sending energy through a subsurface volume of interest to a receiver. In some implementations, the subsurface energy values may be characterized as the response of the elastic wavefield to contrasts across interfaces of subsurface layers as energy travels from a source through the subsurface to a receiver. The subsurface data may include a seismic angle stack value, a prestack seismic property value, and an amplitude versus offset (AVO) gather value. It should be appreciated that these are exemplary; other subsurface data may include 1D seismic data, 2D seismic data, 3D seismic data, 4D seismic data, 3C seismic data, and/or 4C seismic data. In some implementations, the subsurface data may include a representation of the seismic energy values, such as, for example a seismic image. The subsurface data may be heterogenous (e.g., multiple different categories of subsurface features) or homogenous (e.g., a single category of subsurface feature).

Subsurface feature data may include structural identification values and/or categorization values. The subsurface feature data may be used to identify and/or estimate the identities and locations of subsurface features in the subsurface volume of interest. In implementations, subsurface feature data may use geological features, geological structures, seismic structures, structural traps, stratigraphic traps, faults, fractures, folds, unconformities, methane gas chimneys, etc. to identify subsurface features. Subsurface features may be features produced by deformation of the earth's crust in the subsurface volume of interest.

The structural identification values may indicate whether or not there is a subsurface feature. For example, a first structural identification value may indicate no subsurface feature is present in a subset of the subsurface data. A second structural identification value may indicate some type of subsurface feature is present in a subset of the subsurface data. The structural identification values may be generated based on domain knowledge, collected samples of corresponding subsurface structures, and/or other data. The structural identification values may be defined by structural identification parameters. For example, the structural identification parameters may affect a structural value. A first structural identification parameter with a first weight, a second structural identification parameter with a second weight, and a third structural identification parameter with a third weight may be added, subtracted, or otherwise manipulated together to determine a structural identification value. While three structural identification parameters are listed, it should be appreciated that more or fewer structural identification parameters may be used. Structural identification parameters may include the geometric shape of subsurface horizons (i.e. domal, bowl shaped, etc.), or truncation of subsurface horizons against other geologic elements In some implementations, the structural identification parameters may specify which aspects of a subsurface feature to focus on in the subsurface data. The structural identification parameters may be selected based on aspects of a subsurface feature that have the greatest impact on identifying whether or not a subsurface feature is present in subsurface data, which is sometimes known as "feature engineering." In implementations, feature engineering may be accomplished based on machine learning, domain knowledge, and/or other techniques.

The categorization values may indicate what category the subsurface feature is categorized as and/or what sub-category the subsurface feature is categorized as. For example, the categorization value may indicate that a subset of the subsurface data is likely categorized as a folded subsurface feature. In implementations, the categorization value may indicate that the subset of the subsurface data is likely in a sub-category of the folded subsurface feature, such as, for example, a fault bend fold sub-category. The categorization values may be generated based on domain knowledge, collected samples of corresponding subsurface structures, and/or other data. The categorization values may be defined by categorization parameters. In some implementations, the categorization values may be defined by categorization parameters and the structural identification values. For example, the categorization parameters may affect a categorization value. A first categorization parameter with a first weight, a second categorization parameter with a second weight, and a third categorization parameter with a third weight may be added, subtracted, or otherwise manipulated together to determine a categorization value. While three categorization parameters are listed, it should be appreciated that more or fewer categorization parameters may be used. Categorization parameters may include image-based features (e.g., Histogram of oriented gradients (HOG), scale-invariant feature transform (SIFT), and/or parameters similar to analog geologic features that may be derived from conceptual geologic models In some implementations, the categorization parameters may specify which aspects of a subsurface feature category to focus on in the subsurface data. The categorization parameters may be selected based on aspects of a subsurface feature category that have the greatest impact on identifying subsurface features in subsurface data, which is sometimes known as "feature engineering." In implementations, feature engineering may be accomplished based on machine learning, domain knowledge, and/or other techniques.

In some implementations, different ones of the structural identification parameters and the categorization parameters may be weighted differently based on the conditioned subsurface feature model.

FIG. 1 illustrates a system for identifying subsurface features as a function of position in a subsurface volume of interest, in accordance with one or more implementations. In some implementations, system 100 may include a server 102. Server 102 may be configured to communicate with a client computing platform 104 according to a client/server architecture and/or other architectures. Client computing platform 104 may be configured to communicate with other client computing platforms via server 102 and/or according to a peer-to-peer architecture and/or other architectures. Users may access system 100 via client computing platform 104.

Server 102 may be configured by machine-readable instructions 106. Machine-readable instructions 106 may include an instruction component. The instruction component may include computer program component. The instruction component may include a subsurface feature model component 108, a subsurface data component 110, a subsurface feature component 112, a representation component 114, and/or another instruction component.

Subsurface feature model component 108 may be configured to obtain an initial subsurface feature model. The initial subsurface feature model may be based on machine learning techniques to map at least one variable to at least another variable. For example, the initial subsurface feature model may receive subsurface data as input and output subsurface feature data. The initial subsurface feature model may be "untrained" or "unconditioned," indicating it may not estimate an output based on the input as accurately as a "trained" or "conditioned" model.

Figure 2:
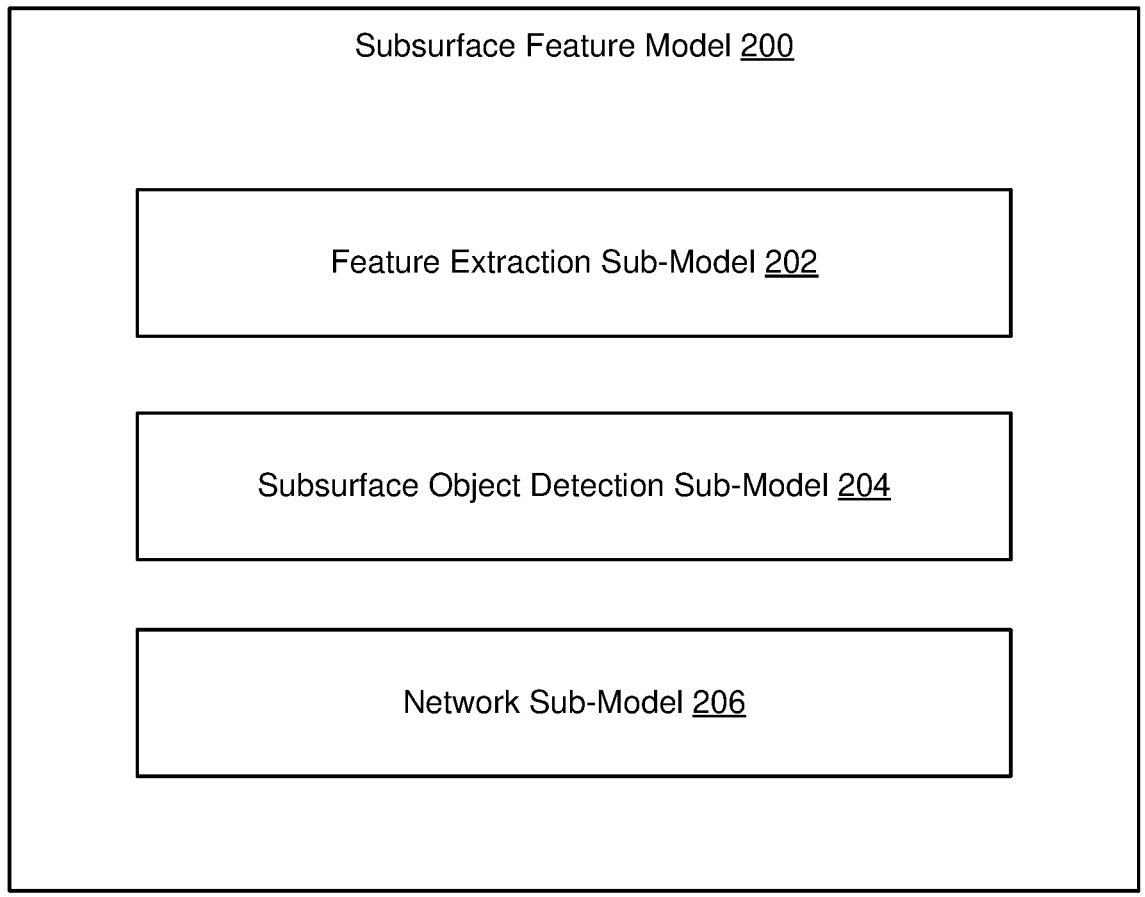
FIG. 2 illustrates example sub-models of a subsurface feature model, in accordance with one or more implementations.

FIG. 2 illustrates an example subsurface feature model 200, in accordance with one or more implementations. Subsurface feature model 200 may include feature extraction sub-model 202, subsurface object detection sub-model 204, and network sub-model 206. It should be appreciated that these models may include initial models or conditioned models, even though one or both may not be explicitly discussed.

Feature extraction sub-model 202 may identify and extract features in subsurface data. Feature extraction sub-model 202 may accomplish this through one of the following.

Feature extraction sub-model 202 may include convoluting subsurface data. It should be appreciated that either training or target data may be used with feature extraction sub-model 202. Convolution may refer to applying a matrix to data, i.e., subsurface data. For example, convoluting data may include using a kernel (i.e., a matrix of weights) that passes over input data to generate a single data point. In some implementations, the kernel may perform a dot product over the region of the input data the kernel is currently covering to generate the single data point. In implementations, this single data point (i.e., a single piece of convoluted subsurface data) may form part of the resulting data (i.e., convoluted subsurface data). The convoluted subsurface data may be a matrix of dot products. Some convoluted subsurface data may detect lower level features (e.g., colors, edges, simple shapes, and the like) and other convoluted subsurface data may detect higher level features (e.g., complex shapes, objects, patterns, and the like). In some implementations, earlier convoluted subsurface data may contribute to subsurface data that is convoluted later. To provide an example, the edges and simple shapes that earlier convolution matrices are used to detect may be incorporated into more complex shapes that later convolution matrices are used to detect.

In one example, a feature pyramid network may be used. The input data may be a matrix or an image and the kernel may be a 3×3 matrix that passes over a 3×3 pixel space to generate a single data point. So, for a 25×25 pixel image, there may be a resulting 3×3 convolution where each element in the matrix corresponds to a weighted sum of each pass over the 25×25 pixel image. It should be appreciated that images may have more pixels than a 25×25 pixel image, and that this pixel image size is used for descriptive purposes. The weights in the matrix of weights may be learned and/or improved through training data. The feature extraction sub-model 202 may be trained to improve a speed, an accuracy, a number of resources used, and/or another parameter of the feature extraction sub-model 202. Additional convolutional matrices may be used in additional layers which may decrease spatial resolution while being able to capture semantic contexts embedded in larger receptive fields. For example, feature pyramids, among other ML techniques, may leverage the input of different resolutions and can incorporate the features at different scales, which improves the ability of recognizing large scale targets for a ML network. Semantic information may refer to context information, which may include large scale geological settings. In implementations, layers may be constructed via a top-down pathway to construct higher resolution layers from the convolution layers that have more semantic value. In order to maintain spatial locations within the input data, lateral connections may be added between the constructed layers and the convolutional layers. It should be appreciated that other models may be used, including a featurized image pyramid, a pyramidal feature hierarchy, TDM, SharpMask, RED-Net, and/or U-NET, though this list is not exhaustive.

In implementations, feature extraction sub-model 202 may include filtering convoluted subsurface data to generate subsurface feature map layers. The filtering may refer to selecting the subsurface data based on a spatial scale. It should be appreciated that other computer vision techniques and machine learning techniques may be used in lieu of, or in addition to, the convolutions and filters discussed herein. In some implementations, all of the convoluted subsurface data may be used.

In implementations, the filtering may include aggregating different convoluted subsurface datasets corresponding to a given subsurface feature to generate subsurface feature map layers.

In some implementations, the first subsurface feature map layer may be an earlier subsurface feature map layer than a second subsurface feature map layer, a third subsurface feature map layer, and so on. In implementations, a second subsurface feature map layer may rely on the first subsurface feature map layer. The third subsurface feature map layer may rely on the second subsurface feature map layer, and so on.

Subsurface object detection sub-model 204 may detect objects in the subsurface data. Subsurface object detection sub-model 204 may accomplish this through one of the following.

Subsurface object detection sub-model 204 may include detecting potential subsurface features in the subsurface feature map layers. In each subsurface feature map layer, a subsurface feature may be detected. In implementations, multiple subsurface feature map layers may be used together to detect a subsurface feature. In some implementations, the weight applied to each subsurface feature map layer in identifying and detecting a subsurface feature may be different. The weights may be learned through training data. The subsurface object detection sub-model 204 may be trained to improve a speed, an accuracy, a number of resources used, and/or another parameter of the subsurface object detection sub-model 204. The weighted subsurface feature map layers may be used to identify and detect the subsurface feature map layers.

For example, a first weight with a first subsurface feature map layer, a second weight with a second subsurface feature map layer, a third weight with a third subsurface feature map layer, a fourth weight with a fourth subsurface feature map layer, and a fifth weight with a fifth subsurface feature map layer may be used to identify and detect a subsurface feature. In some implementations, a weight may be 0 so that a corresponding subsurface feature map layer has no effect on detecting the potential subsurface features.

In implementations, the subsurface object detection sub-model 204 may include prototypical candidates of the subsurface features. The prototypical candidates may be collected from the field, generated from simulation models (e.g., computational stratigraphy models and/or other physics-driven simulation models), and/or modified thereafter, as will be discussed herein.

In implementations, the detected subsurface features may be labeled or otherwise classified based on the detected subsurface feature. For example, a SoftMax function may be used to output probabilistic categorical information for the input subsurface data.

Subsurface object detection sub-model 204 may include masking the subsurface features. Based on the potential subsurface features detected, the potential subsurface features may be masked in the corresponding subsurface data. In implementations, this may include a bounding box approach. In some implementations, the shape of the mask may correspond to the edges of the subsurface feature. In implementations, a subsurface feature map layer may be used to mask the subsurface feature. For example, a subsurface feature map layer that was used to identify edges and/or contours of the potential subsurface feature may be used to mask those corresponding elements of the subsurface features. In some implementations, a more granular mask may be used on a pixel by pixel basis via segmentation, bounding boxes, and/or other techniques.

Network sub-model 206 may generate relationships between subsurface features and locations in the subsurface volume of interest. Lateral connections may be added between the constructed layers and the convolutional layers discussed above to help maintain spatial locations within the input data. Network sub-model 206 may help provide meaningful semantic information while maintaining the spatial location of such semantic information. In implementations, network sub-model 206 may estimate subsurface feature data by linking the masked subsurface features to the subsurface data. In some implementations, network sub-model 206 may link the classified subsurface features to the target subsurface feature data. This may include locating it within the image space of the subsurface data, identifying parameters in the subsurface data that affected the subsurface feature decision, and/or other links.

The subsurface feature models disclosed herein may include, for example, a neural network, a random forest model, a support vector machine, a regression, a Bayesian network, a mask R-CNN network, a feature pyramids network, an object detection network, an object recognition network, and/or other subsurface feature models. It should be appreciated that other subsurface feature models may include, for example, convolutional neural networks, reinforcement learning, transfer learning, and/or other machine learning technologies. In implementations, the subsurface feature model may use bounding boxes, seismic interpretation results, and/or labels to identify subsurface features. It should also be appreciated that while an initial subsurface feature model, initial subsurface feature extraction sub-model, initial subsurface object detection sub-model, initial network sub-model, conditioned subsurface feature model, conditioned subsurface feature extraction sub-model, conditioned subsurface object detection sub-model, and conditioned network sub-model may not be explicitly discussed, the above applies with equal force to these models and sub-models as well.

In one example, the subsurface feature model may be a deep learning network with a latent space. In the latent space constructed by convolutional layers, every prototypical candidate may be taught to match an image patch for the images belonging to the same category of subsurface feature. These learned prototype patches may be used to compare against the input images in a prediction stage of the subsurface feature model. A similarity score, possibly a weighted sum based on multiple prototypes, may be used to make an identification decision. In this example, the learned prototype patches and a part of the seismic image that is most activated in the comparison process may provide an interpretable logic for the identification decision. Based on multiples parts in a seismic image patch being very similar to multiple prototypes of a given category of subsurface feature, the subsurface feature model may localize this image patch, mark this patch with the subsurface feature, and label it.

Referring back to FIG. 1, in some implementations, subsurface feature model component 108 may be configured to generate a conditioned subsurface feature model. The conditioned subsurface feature model may be generated by training the initial subsurface feature model using training subsurface data, weighted prototypical candidates, weighted matrices, and/or training subsurface feature data. In implementations, the subsurface feature model is "conditioned," indicating the subsurface feature model may have been trained to optimize performance and/or improve accuracy of the initial subsurface feature model. For example, the conditioned subsurface feature model may more accurately output subsurface feature data using subsurface data as input. In some implementations, the conditioned subsurface feature model may identify subsurface features in the subsurface volume of interest. In implementations, the conditioned subsurface feature model may be trained using generic subsurface data such that the conditioned subsurface feature model may be implemented in any subsurface volume of interest that is not limited to the volume of interest from which the generic training data is sampled and/or generated.

Training the initial subsurface feature model may include applying the training subsurface data to the initial subsurface feature model to generate a first iteration of subsurface feature data. The initial subsurface feature model, including the relevant sub-models, may be adjusted to more accurately estimate the subsurface feature data based on differences between the first iteration of subsurface feature data and the training subsurface feature data that corresponds to the training subsurface data. This is repeated numerous times until the initial subsurface feature model is "conditioned," i.e., it is able to output subsurface feature data that is consistently within a threshold of the training subsurface feature data. In some implementations, the threshold may depend on the speed of the subsurface feature model, resources used by the subsurface feature model, and/or other optimization metrics. This threshold may be based on an average of values, a maximum number of values, and/or other parameters. It should be appreciated that other metrics may be applied to determine that the first subsurface feature model is "conditioned."

In one example, the subsurface feature model may be trained based on a cross-entropy loss function and/or an adversarial loss function. The adversarial loss function may be $$\min_{f_D, f_F} L_D(f_D(f_F(X)), Y_D) - w L_G(f_G(f_F(X)), Y_G)$$

where $L_D(f_D(F_F(X)), Y_D)$ may refer to a task related loss and $w L_G(f_G(f_F(X)), Y_G)$ may refer to a geometrical location classification loss. In addition, $f_D$ may refer to an object detection sub-model, $f_F$ may refer to a feature extraction sub-model, $Y_D$ may refer to a ground truth for detection, $L_D$ may refer to the cross-entropy loss, $f_G$ may refer to a network sub-model, $L_G$ may refer to the geometrical location classification loss, $Y_G$ may refer to the ground truth of geometrical locations, and $w$ may refer to a weight. Training the subsurface feature model based on the adversarial loss function may allow the conditioned subsurface feature model to be used globally without requiring new training data specific to another subsurface volume of interest. In implementations, $f_G$ may be trained based on $$\max_{f_G} L_G(f_G(f_F(X)), Y_G)$$

where the variables have similar, or the same, meaning as described herein. In some implementations, the $f_G$ and the adversarial loss function may be optimized together.

In some implementations, subsurface feature model component 108 may be configured to store the conditioned subsurface feature model. For example, the conditioned subsurface feature model can be stored in a non-transitory storage medium, electronic storage 130, non-transient computer readable mediums, and/or optical storage. It should be appreciated that these are merely examples and that the conditioned subsurface feature model can be stored in other storage as well (e.g., structured storage, unstructured storage, and/or virtual storage).

Subsurface data component 110 may be configured to obtain and/or generate training subsurface data. The training subsurface data may be used to train a subsurface feature model, as discussed herein. The training subsurface data may initially be collected and/or measured via sensors in a subsurface volume of interest (e.g., field data) and/or be generated through the use of simulation models (e.g., synthetic data). Field data may be collected and/or measured from a well and/or reservoir in a subsurface volume of interest. Field data may include seismic data, seismic images, and/or other data. In some implementations, the subsurface data may be processed via statistical analysis, visualization techniques, scaling, warping, denoising, noising, and/or other means before being used to train the initial subsurface models. For example, domain experts may select and manipulate field data that simulates prototypical candidates of a subsurface feature to generate the training subsurface data. In some implementations, the selected candidates may be scaled up or down, warped, denoised, noised, and otherwise manipulated to simulate a variety of target subsurface data. In implementations, domain experts may generate prototypical candidates from scratch. In some implementations, the simulation models may be based on one of computational stratigraphy, kinematic forward models, geostatistics models, or geomechanical forward models. The subsurface data may be stored, and examples of such storage are discussed herein. The stored subsurface data may be obtained and/or used as part of the training subsurface data. In other words, training subsurface data may use one or both of field data and synthetic data. In implementations, the training subsurface data may be labeled, categorized, and/or otherwise pre-identified as being a subsurface feature and/or a category of subsurface feature.

In some implementations, subsurface data component 110 may be configured to obtain target subsurface data. The target subsurface data may be field data (e.g., data that is collected and/or measured from a well and/or reservoir). The target subsurface data may not have corresponding subsurface feature data to confirm the conditioned subsurface feature model is accurately identifying subsurface features in the subsurface data. In implementations, the target subsurface data may have corresponding subsurface feature data and be used to verify the conditioned nature of the conditioned subsurface feature model. The target subsurface data may include subsurface energy values in a subsurface volume of interest. In implementations, the target subsurface data may be preprocessed via denoising, data augmentation, and/or other preprocessing techniques. While a singular set of target subsurface data is described, it should be appreciated that multiple sets of target subsurface data may be obtained and/or generated.

Subsurface feature component 112 may be configured to obtain and/or generate training subsurface feature data. The training subsurface feature data may be used to train an initial subsurface feature model, as discussed herein. The training subsurface feature data may initially be collected and/or measured via sensors in a subsurface volume of interest (e.g., field data) and/or be generated through the use of simulation models (e.g., synthetic data), as described herein. The same simulation models used to generate the training subsurface data may also be able to use the training subsurface data to generate training subsurface feature data, or vice versa. The subsurface feature data may be engineered by domain experts to simulate the wide variety of potential subsurface data that can be collected and analyzed to generate the subsurface feature data, as described herein. The synthetic subsurface feature data may be stored, and examples of such storage are discussed herein. The stored synthetic subsurface feature data may be obtained and/or used as part of the training subsurface feature data. In other words, training subsurface feature data may use one or both of field data and synthetic data.

In implementations, the training subsurface feature data may correspond to the training subsurface data. In some implementations, the training subsurface feature data may be derived from the training subsurface data using prototypical subsurface feature candidates, the simulation model, fluid models, rock physics, and/or other models.

In some implementations, subsurface feature component 112 may be configured to generate target subsurface feature data. The target subsurface feature data may be generated by applying the conditioned subsurface model to the target subsurface data. As discussed herein, the first conditioned subsurface feature model can accurately estimate the target subsurface feature data using the target subsurface data as input because the conditioned subsurface feature model has been "trained" or "conditioned." The target subsurface feature data may identify a subsurface feature in the subsurface volume of interest. The target subsurface feature data may include a target structural identification value and a target categorization value. The target structural identification value may be defined by the structural identification parameters as a function of position in the subsurface volume of interest. The target categorization value may be defined by the categorization parameters and the target structural identification value as a function of position in the subsurface volume of interest.

In implementations, applying the conditioned subsurface model to the target subsurface data may include generating convoluted target subsurface data by convoluting the target subsurface data, as discussed herein. Applying the conditioned subsurface model to the target subsurface data may also include generating target subsurface feature map layers by applying filters to the convoluted target subsurface data, as discussed herein. Applying the conditioned subsurface model to the target subsurface data may include detecting potential target subsurface features in the target subsurface feature map layers. Applying the conditioned subsurface model to the target subsurface data may also include masking the target subsurface features. Applying the conditioned subsurface model to the target subsurface data may include estimating target subsurface feature data by linking the masked subsurface features to the target subsurface feature data.

In some implementations, applying the conditioned subsurface model to the target subsurface data may include generating target subsurface feature map layers by convoluting the target subsurface data, as discussed herein. Applying the conditioned subsurface model to the target subsurface data may also include detecting potential target subsurface features in the target subsurface feature map layers. Applying the conditioned subsurface model to the target subsurface data may include classifying the detected target subsurface features. Applying the conditioned subsurface model to the target subsurface data may also include linking the classified subsurface features to the target subsurface feature data.

Representation component 114 may be configured to generate a representation of the subsurface data and/or subsurface feature data. The representation may be generated using visual effects to depict at least some of the subsurface data and/or subsurface feature data as a function of position. The visual effects may include a visual transformation of the representation. A visual transformation may include a visual change in how the representation is presented or displayed. In some implementations, a visual transformation may include a visual zoom, a visual filter, a visual rotation, and/or a visual overlay (e.g., text and/or graphics overlay). In some implementations, a representation of the other subsurface data and/or subsurface feature data may be generated. In some implementations, the representation may be a video.

In one example, the representation may include a map overlay. The map overlay may include a digital elevation model map, a gross depositional environment map, a geophysical attribute, a physical map, a political map, seismic image, subsurface image, and/or other types of images. The map may be displayed as a raster image, a contour map, or a thematic map; it may also be partially transparent to view other information displayed below it. The first representation may illustrate a map of the subsurface volume of interest and corresponding subsurface data and/or subsurface feature data. Different sets of data may be represented using different colors and/or shades of a color.

For example, a first set of target subsurface feature data may be represented using a color gradient, a second set of target subsurface feature data may be represented using a color bar (e.g., different colors), and/or other visual effects to represent the subsurface data and/or subsurface feature data. In one example, target subsurface data may be under visually transparent subsurface feature data that masks and identifies subsurface features in the subsurface volume of interest. In implementations, selecting an identified subsurface feature may display additional information about the subsurface feature, which may include assumptions in the conditioned subsurface model, and/or other information and metadata about the subsurface feature, including what category or subcategory it corresponds to.

Representation component 114 may be configured to display the representation. The representation may be displayed on a graphical user interface and/or other displays. The graphical user interface may include a user interface based on graphics and/or text. In implementations, a user may zoom in on and/or view a location of the volume of interest to illustrate more detail on a given location. The graphical user interface may be configured to receive voice input, gestures, haptic input, keyboard, mouse, and/or other input.

In some implementations, server 102, client computing platform 104, and/or external resources 128 may be operatively linked via an electronic communication link. For example, such electronic communication link may be established, at least in part, via a network such as the Internet and/or other networks. It will be appreciated that this is not intended to be limiting, and that the scope of this disclosure includes implementations, in which server 102, client computing platform 104, and/or external resources 128 may be operatively linked via some other communication media.

A given client computing platform 104 may include a processor to execute computer program components. The computer program components may enable a user corresponding to the given client computing platform 104 to interface with system 100 and/or external resources 128, and/or provide other functionality attributed herein to client computing platform 104. By way of non-limiting example, the given client computing platform 104 may include a desktop computer, a laptop computer, a handheld computer, a tablet computing platform, a Netbook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server 102 may include electronic storage 130, processor 132, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 130 may include storage media that electronically stores information. The non-transitory storage media of electronic storage 130 may include one or both of system storage that is provided integrally (i.e., substantially non-removable) with server 102 and/or removable storage that is removably connectable to server 102 via, for example, a port (e.g., a USB port, a firewire port, and/or other ports) or a drive (e.g., a disk drive and/or other drives). Electronic storage 130 may include non-transitory storage medium, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 130 may include a virtual storage resource (e.g., cloud storage, a virtual private network, and/or other virtual storage resources). Electronic storage 130 may store software algorithms, information determined by processor 132, information received from server 102, information received from client computing platform 104, and/or other information that enables server 102 to function as described herein. It should be appreciated that the information may be stored in its natural and/or raw format (e.g., data lakes).

Processor 132 may provide information processing capabilities in server 102. As such, processor 132 may include a physical computer processor, a digital processor, an analog processor, a digital circuit designed to process information, an analog circuit designed to process information, a state machine, and/or other mechanisms for electronically processing information. Although processor 132 is shown in FIG. 1 as a single entity, this is for illustrative purposes only. In some implementations, processor 132 may include a plurality of processing units. These processing units may be physically located within the same device, or processor 132 may represent processing functionality of a plurality of devices operating in coordination. Processor 132 may execute components 108, 110, 112, 114, and/or other components. Processor 132 may execute components 108, 110, 112, 114, and/or other components by software; hardware; firmware; some combination of software, hardware, and/or firmware; and/or other mechanisms for configuring processing capabilities on processor 132. As used herein, the term "component" may refer to any component or set of components that perform the functionality attributed to the component. This may include a physical processor during execution of processor readable instructions, the processor readable instructions, circuitry, hardware, storage media, or any other components.

It should be appreciated that although components 108, 110, 112, and 114, are illustrated in FIG. 1 as being implemented within a single processing unit, in implementations, in which processor 132 includes multiple processing units, one of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one of components 108, 110, 112, and/or 114 may be eliminated, and some or all of its functionality may be provided by other ones of components 108, 110, 112, and/or 114. As an example, processor 132 may execute an additional component that may perform some or all of the functionality attributed below to components 108, 110, 112, and/or 114.

Figure 3A:
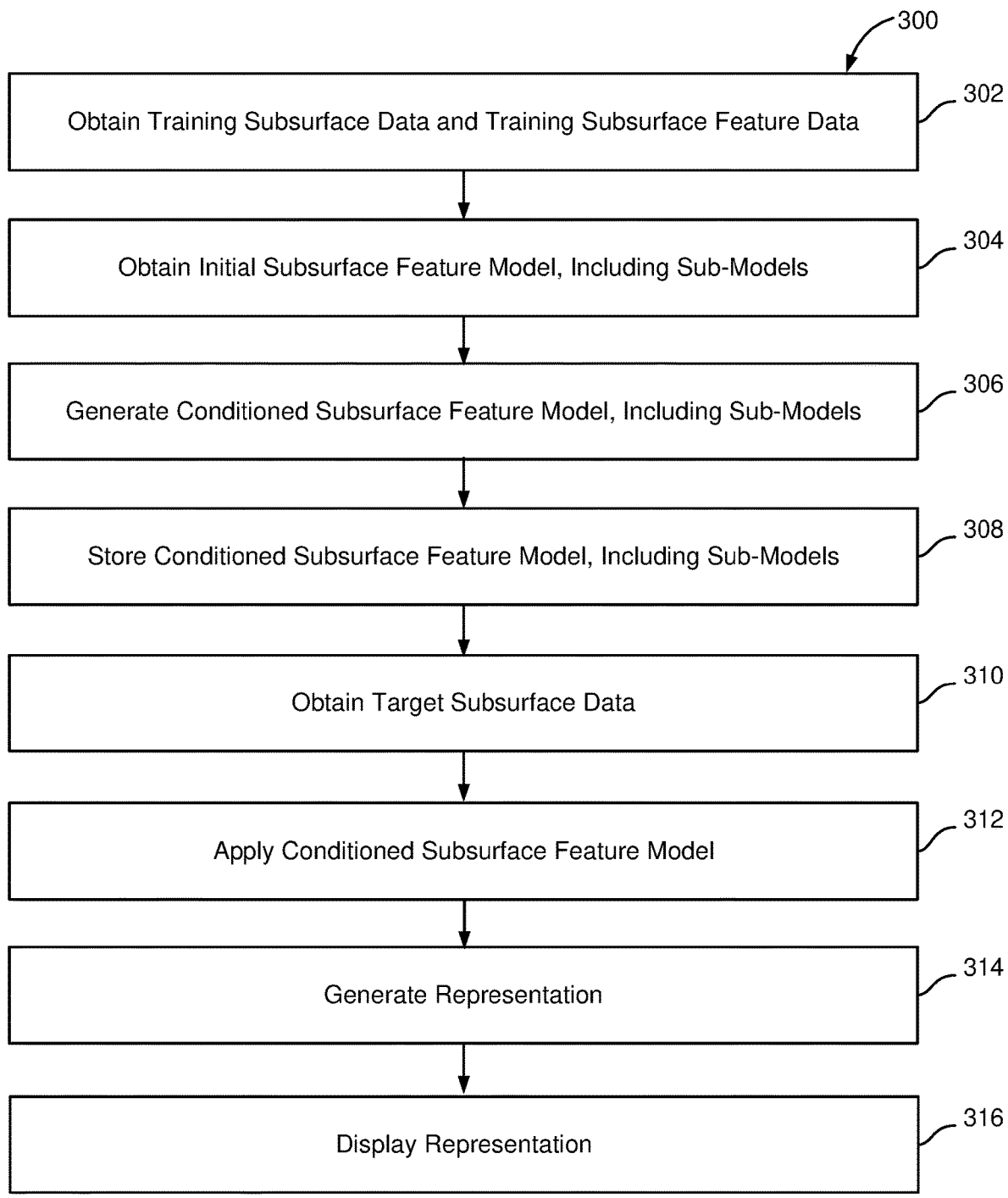
FIG. 3A illustrates an example operational flow diagram for training a subsurface feature model to identify subsurface features as a function of position in a subsurface volume of interest and identifying subsurface features as a function of position in a subsurface volume of interest, in accordance with one or more implementations of the present disclosure.
Figure 3B:
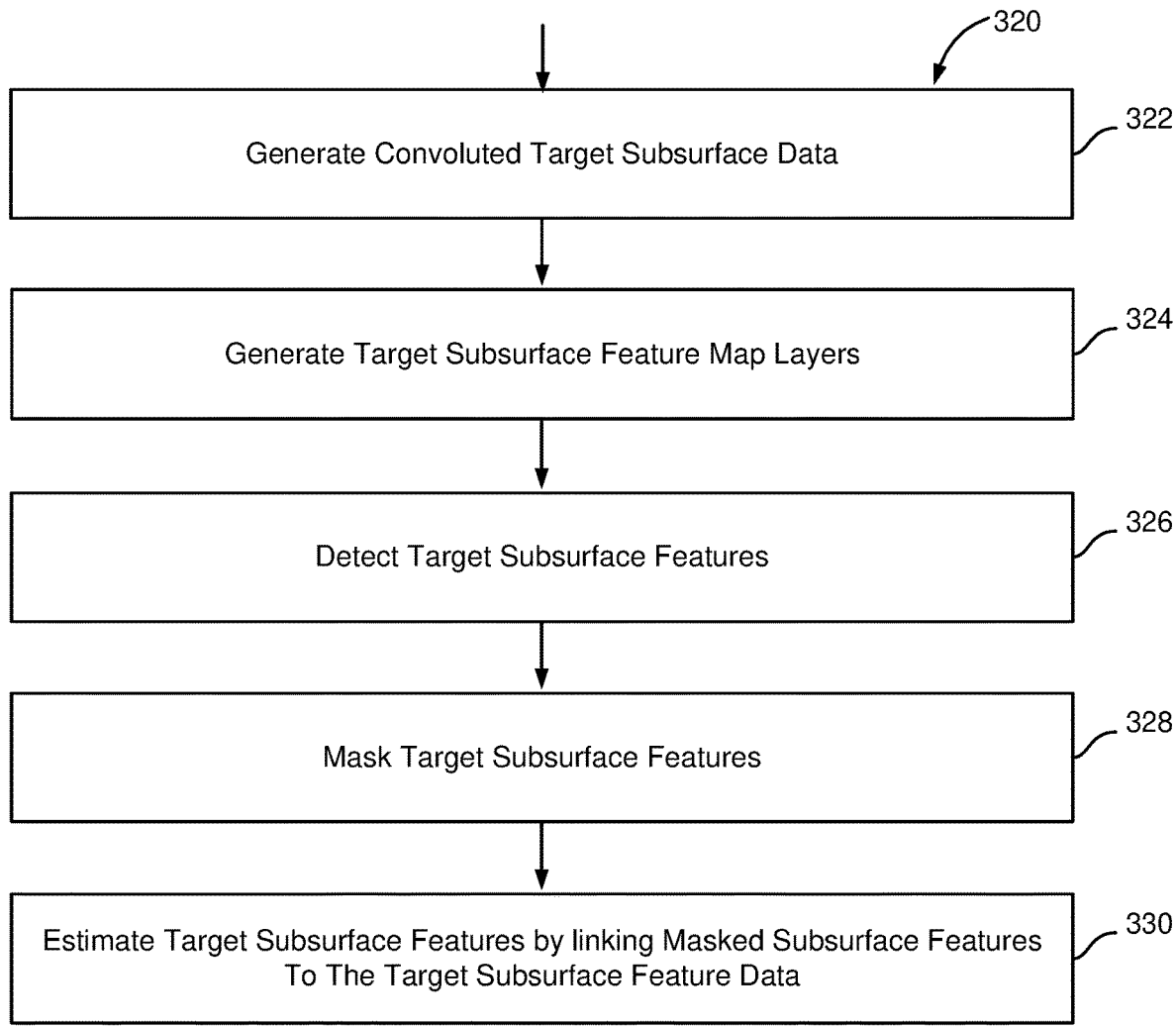
FIG. 3B illustrates an example operational flow diagram for applying the conditioned subsurface feature model, in accordance with one or more implementations of the present disclosure.
Figure 3C:
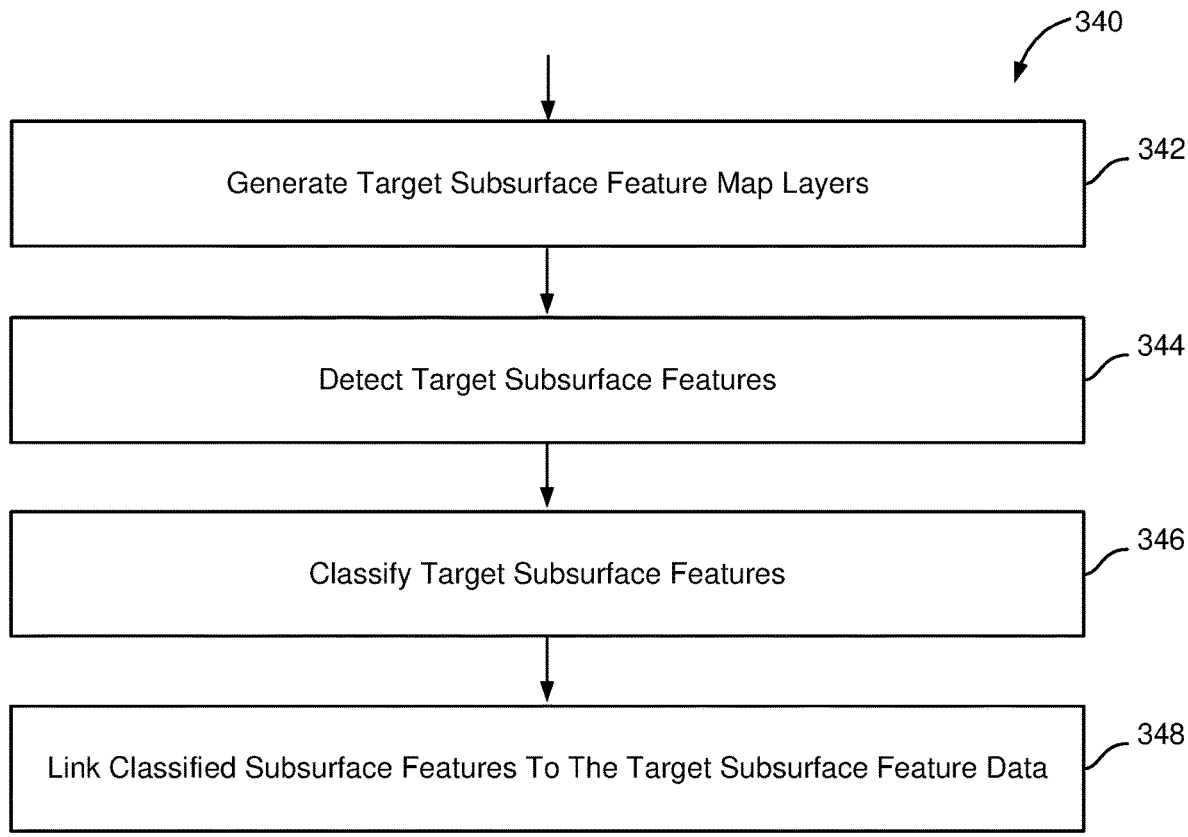
FIG. 3C illustrates an example operational flow diagram for applying the conditioned subsurface feature model, in accordance with one or more implementations of the present disclosure.

FIG. 3 illustrates an example operational flow diagram 300 for training a subsurface feature model to identify subsurface features as a function of position in a subsurface volume of interest and identifying subsurface features as a function of position in a subsurface volume of interest, in accordance with one or more implementations of the present disclosure. The operations of 300, 320, 340, and 400 presented below are intended to be illustrative. In some implementations, 300, 320, 340, and 400 may be accomplished with additional operations not described, and/or without one of the operations discussed. Additionally, the order in which the operations of methods 300, 320, 340, and 400 are illustrated in FIGS. 3A, 3B, 3C, and 4 and described below is not intended to be limiting.

In some implementations, methods 300, 320, 340, and 400 may be implemented in a processing device (e.g., a physical computer processor, a digital processor, an analog processor, a digital circuit designed to process information, an analog circuit designed to process information, a state machine, and/or other mechanisms for electronically processing information). The processing device may include a device executing some or all of the operations of methods 300, 320, 340, and 400 in response to instructions stored electronically on a non-transitory storage medium. The processing device may include a device configured through hardware, firmware, and/or software to be specifically designed for execution of operations of methods 300, 320, 340, and 400.

302 may include obtaining training subsurface data and training subsurface feature data. The training subsurface data may specify subsurface energy values. In implementations, the training subsurface data may be seismic images including prototypical candidates of subsurface features. The training subsurface data may be used to train the initial subsurface feature model. The training subsurface data may include field data and/or synthetic data, as discussed herein. In some implementations, the training subsurface data may be preprocessed, as discussed herein.

The training subsurface feature data may also be used to train the initial subsurface feature model, as discussed herein. The training subsurface feature data may include structural identification values and categorization values. The training subsurface feature data may include field data and/or synthetic data. The training subsurface feature data may correspond to the training subsurface data.

302 may be perform performed by a physical computer processor configured by machine-readable instructions including a component that is the same as or similar to subsurface data component 110 and/or subsurface feature component 112, in accordance with one or more implementations.

304 may include obtaining an initial subsurface feature model. As discussed herein, the initial subsurface feature model may be based on machine learning techniques and may be "untrained." The initial subsurface feature model may receive subsurface data as input and output subsurface feature data, which identifies subsurface features in the subsurface data. The initial subsurface feature model may include an initial feature extraction sub-model, an initial subsurface object detection sub-model, and initial network sub-models. 304 may be performed by a physical computer processor configured by machine-readable instructions including a component that is the same as or similar to subsurface feature model component 108, subsurface feature model 200, feature extraction sub-model 202, subsurface object detection sub-model 204, and/or network sub-model 206, in accordance with one or more implementations.

306 may include generating a conditioned subsurface feature model. The conditioned subsurface feature model may be generated by training the initial subsurface feature model using training subsurface data and training subsurface feature data. The conditioned subsurface feature model may be an optimized subsurface feature model in comparison to the initial subsurface feature model, as discussed herein. The conditioned subsurface feature model may include a conditioned feature extraction sub-model, a conditioned subsurface object detection sub-model, and conditioned network sub-models. The conditioned subsurface feature model may receive field data from a subsurface volume of interest for the subsurface data as input and output subsurface feature data. 306 may be performed by a physical computer processor configured by machine-readable instructions including a component that is the same as or similar to subsurface feature model component 108, subsurface feature model 200, feature extraction sub-model 202, subsurface object detection sub-model 204, and/or network sub-model 206, in accordance with one or more implementations.

308 may include storing the conditioned subsurface feature model. 308 may be performed by a physical computer processor configured by machine-readable instructions including a component that is the same as or similar to subsurface feature model component 108, subsurface feature model 200, feature extraction sub-model 202, subsurface object detection sub-model 204, and/or network sub-model 206, in accordance with one or more implementations.

310 may include obtaining target subsurface data. The target subsurface data may be field data. The target subsurface data may specify subsurface energy values as a function of position in the subsurface volume of interest. In implementations, the target subsurface data may be preprocessed via feature engineering, denoising, and/or other preprocessing techniques. 310 may be performed by a physical computer processor configured by machine-readable instructions including a component that is the same as or similar to subsurface data component 110, in accordance with one or more implementations.

312 may include applying the conditioned subsurface feature model. Applying the conditioned subsurface feature model may include a number of operations, as discussed in greater detail in FIGS. 3B and 3C. 312 may be performed by a physical computer processor configured by machine-readable instructions including a component that is the same as or similar to subsurface feature model component 108, subsurface feature model 200, feature extraction sub-model 202, subsurface object detection sub-model 204, and/or network sub-model 206, in accordance with one or more implementations.

314 may include generating the representation. The representation may be generated using visual effects to depict at least some of the subsurface data and/or subsurface feature data as a function of position. 314 may be performed by a physical computer processor configured by machine-readable instructions including a component that is the same as or similar to representation component 114, in accordance with one or more implementations.

316 may include displaying the representation. 316 may be performed by a physical computer processor configured by machine-readable instructions including a component that is the same as or similar to representation component 114, in accordance with one or more implementations.

FIG. 3B illustrates an example operational flow diagram 320 for applying the conditioned subsurface feature model, in accordance with one or more implementations of the present disclosure. 322 may include generating convoluted target subsurface data by convoluting the target subsurface data. 322 may be performed by a physical computer processor configured by machine-readable instructions including a component that is the same as or similar to feature extraction sub-model 202, in accordance with one or more implementations.

324 may include generating target subsurface feature map layers by applying filters to the convoluted target subsurface data. Applying the filters may include aggregating different convoluted subsurface datasets corresponding to a given subsurface feature to generate subsurface feature map layers and/or selecting a subset of the total convoluted subsurface data corresponding to a given spatial scale. A given target subsurface feature map layer may correspond to a given spatial scale of the target subsurface data. 324 may be performed by a physical computer processor configured by machine-readable instructions including a component that is the same as or similar to feature extraction sub-model 202, in accordance with one or more implementations.

326 may include detecting potential target subsurface features in the target subsurface feature map layers. This may be accomplished using prototypical candidates, identifying relevant features for a specific subsurface feature, and/or feature engineering to identify parameters that have a greater effect on accurately identifying the subsurface features. 326 may be performed by a physical computer processor configured by machine-readable instructions including a component that is the same as or similar to subsurface object detection sub-model 204, in accordance with one or more implementations.

328 may include masking the target subsurface features. Masking may be in the form of bounding boxes, segmentation, and/or other techniques that separate the subsurface feature from the subsurface data. 328 may be performed by a physical computer processor configured by machine-readable instructions including a component that is the same as or similar to subsurface object detection sub-model 204, in accordance with one or more implementations.

330 may include estimating target subsurface feature data by linking the masked subsurface features to the target subsurface feature data. This may be accomplished by forming connections with the network sub-models between the masked subsurface feature and the target subsurface data to strengthen the sub-models and/or further train the sub-models to better identify subsurface features. 330 may be performed by a physical computer processor configured by machine-readable instructions including a component that is the same as or similar to network sub-model 206, in accordance with one or more implementations.

FIG. 3C illustrates an example operational flow diagram 340 for applying the conditioned subsurface feature model, in accordance with one or more implementations of the present disclosure. 342 may include generating target subsurface feature map layers by convoluting the target subsurface data, as described herein. A given target subsurface feature map layer may correspond to a given spatial scale of the target subsurface data. 342 may be performed by a physical computer processor configured by machine-readable instructions including a component that is the same as or similar to feature extraction sub-model 202, in accordance with one or more implementations.

344 may include detecting potential target subsurface features in the target subsurface feature map layers. This may be accomplished using prototypical candidates, identifying relevant features for a specific subsurface feature, and/or feature engineering to identify features that have a greater effect on accurately identifying the subsurface features. 344 may be performed by a physical computer processor configured by machine-readable instructions including a component that is the same as or similar to subsurface object detection sub-model 204, in accordance with one or more implementations.

346 may include classifying the target subsurface features. Based on a type, category, or class of the subsurface feature, the potential subsurface feature may be labeled accordingly. 346 may be performed by a physical computer processor configured by machine-readable instructions including a component that is the same as or similar to subsurface object detection sub-model 204, in accordance with one or more implementations.

348 may include linking the classified subsurface features to the target subsurface feature data. This may tie the subsurface feature back to the input data (i.e., subsurface data). This may include forming connections with the network sub-models to strengthen the sub-models and/or further train the sub-models to better identify subsurface features, as discussed herein. 348 may be performed by a physical computer processor configured by machine-readable instructions including a component that is the same as or similar to network sub-model 206, in accordance with one or more implementations.

Figure 4:
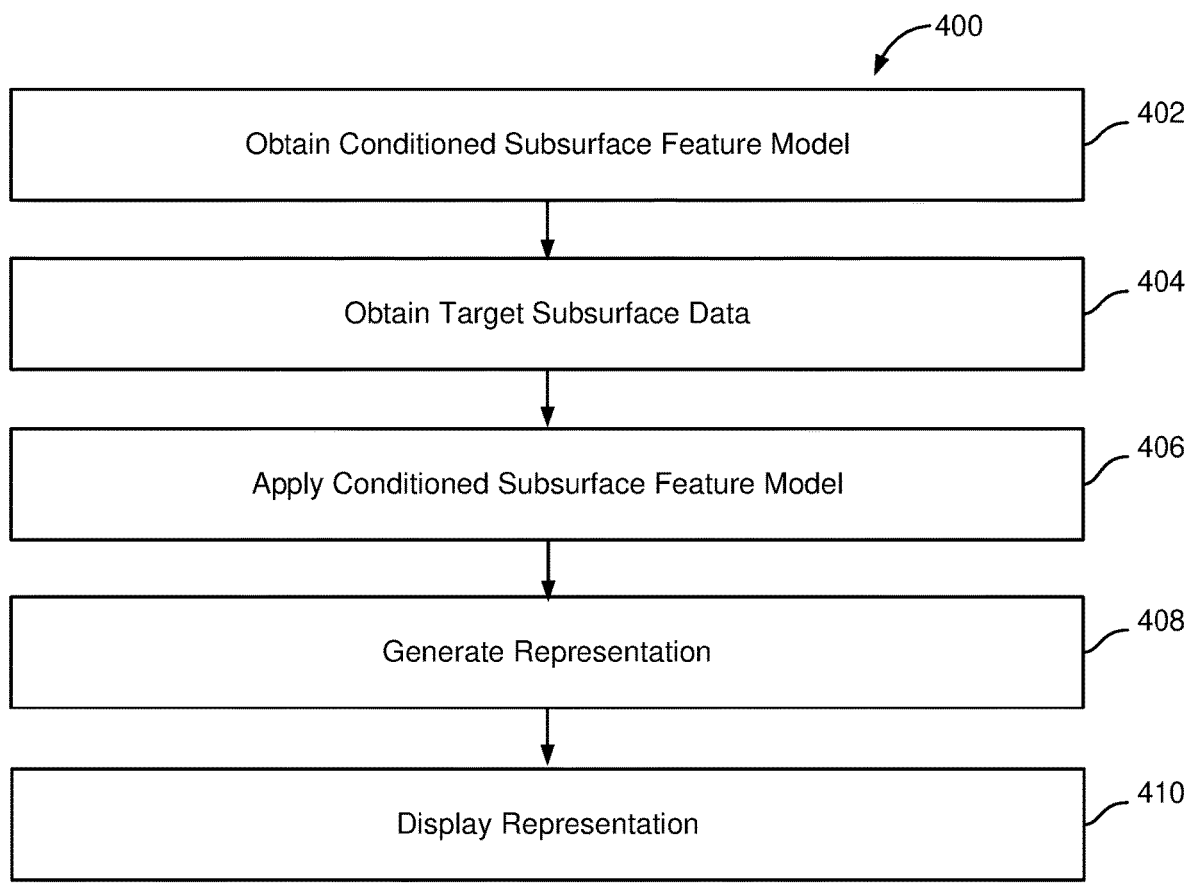
FIG. 4 illustrates an example operational flow diagram for identifying subsurface features as a function of position in a subsurface volume of interest, in accordance with one or more implementations of the present disclosure.

FIG. 4 illustrates an example operational flow diagram 400 for identifying subsurface features as a function of position in a subsurface volume of interest, in accordance with one or more implementations of the present disclosure. 402 may include obtaining the conditioned subsurface feature model. In some implementations, the conditioned subsurface feature model may have already been generated and stored, as discussed herein. 402 may be performed by a physical computer processor configured by machine-readable instructions including a component that is the same as or similar to subsurface feature model component 108, subsurface feature model 200, feature extraction sub-model 202, subsurface object detection sub-model 204, and/or network sub-model 206, in accordance with one or more implementations.

404 may include obtaining target subsurface data. This may be substantially similar to, or the same as, 310. 404 may be performed by a physical computer processor configured by machine-readable instructions including a component that is the same as or similar to subsurface data component 110, in accordance with one or more implementations.

406 may include applying the conditioned subsurface feature model, as discussed herein. This may be substantially similar to, or the same as, FIGS. 3B and/or 3C. 406 may be performed by a physical computer processor configured by machine-readable instructions including a component that is the same as or similar to subsurface feature model component 108, subsurface feature model 200, feature extraction sub-model 202, subsurface object detection sub-model 204, and/or network sub-model 206, in accordance with one or more implementations.

408 may include generating the representation. This may be substantially similar to, or the same as, 314. 408 may be performed by a physical computer processor configured by machine-readable instructions including a component that is the same as or similar to representation component 114, in accordance with one or more implementations.

410 may include displaying the representation. This may be substantially similar to, or the same as, 316. 310 may be performed by a physical computer processor configured by machine-readable instructions including a component that is the same as or similar to representation component 114, in accordance with one or more implementations.

Figure 5:
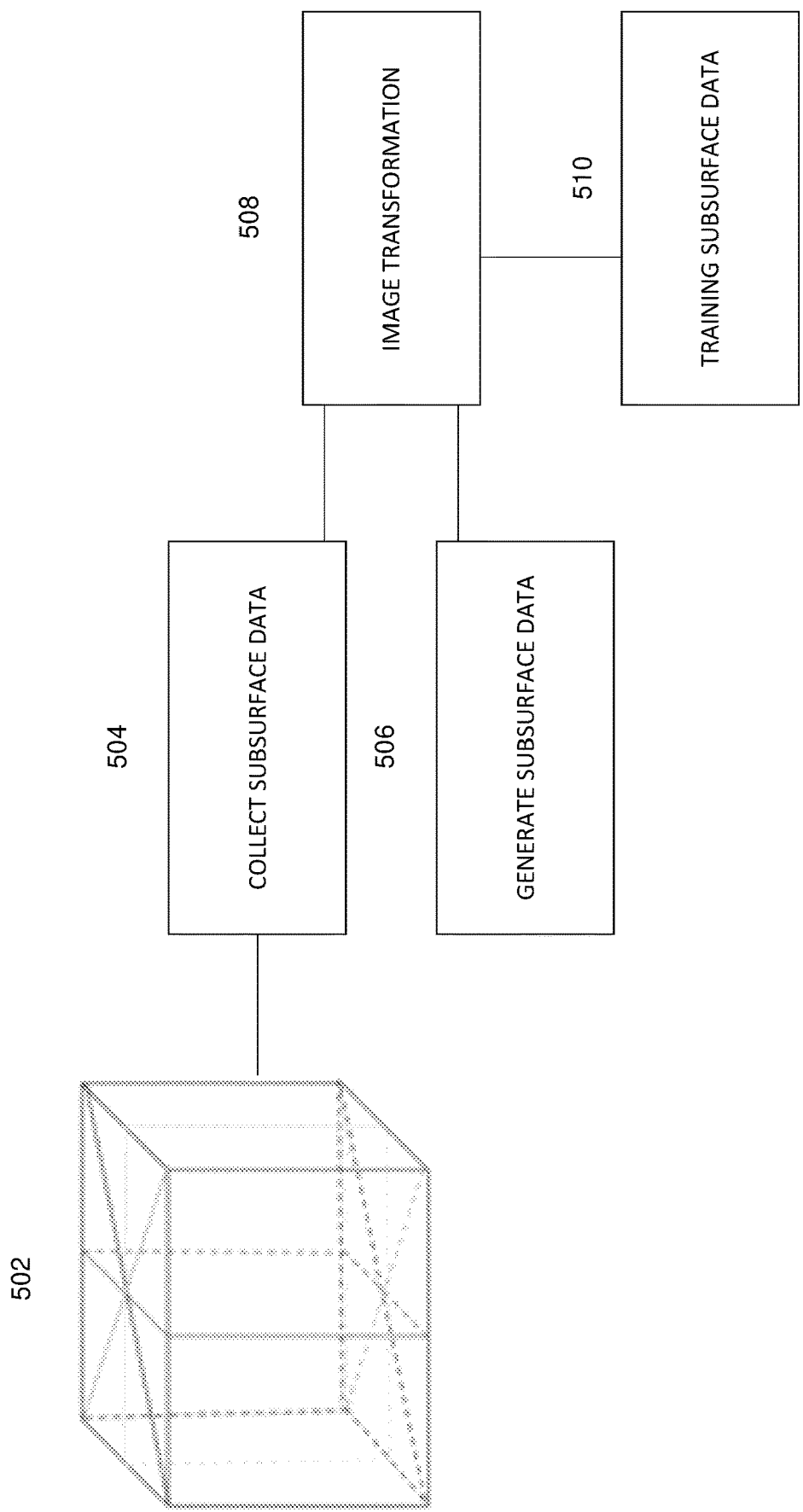
FIG. 5 illustrates an example workflow to generate training subsurface data, in accordance with one or more implementations of the present disclosure.

FIG. 5 illustrates an example workflow to generate training subsurface data, in accordance with one or more implementations of the present disclosure. 502 may show a 3D geological structure. 504 may refer to collecting subsurface data from the 3D geological structure. For example, this may be accomplished by taking slices from the 3D geological structure. 506 may refer to generating subsurface data using simulation models, as discussed herein. 508 may refer to performing image transformations to the collected and/or generated subsurface data. This may include warping, scaling up, scaling down, distorting, cutting off parts of an image, and/or other modifications. The collected subsurface, data, generated subsurface data, and/or modified subsurface data may be used as the training subsurface data.

The presently disclosed technology may provide robust systems and methods to identify multiple different structural features based on machine learning that leverages the technology discussed herein. For example, the presently disclosed technology can be used to identify structural features in a heterogeneous seismic image based on the various models used and corresponding loss functions. The presently disclosed technology may provide significant advantages to reservoir management decisions, such as for example, well development, production forecasting, reservoir performance.

Figure 6:
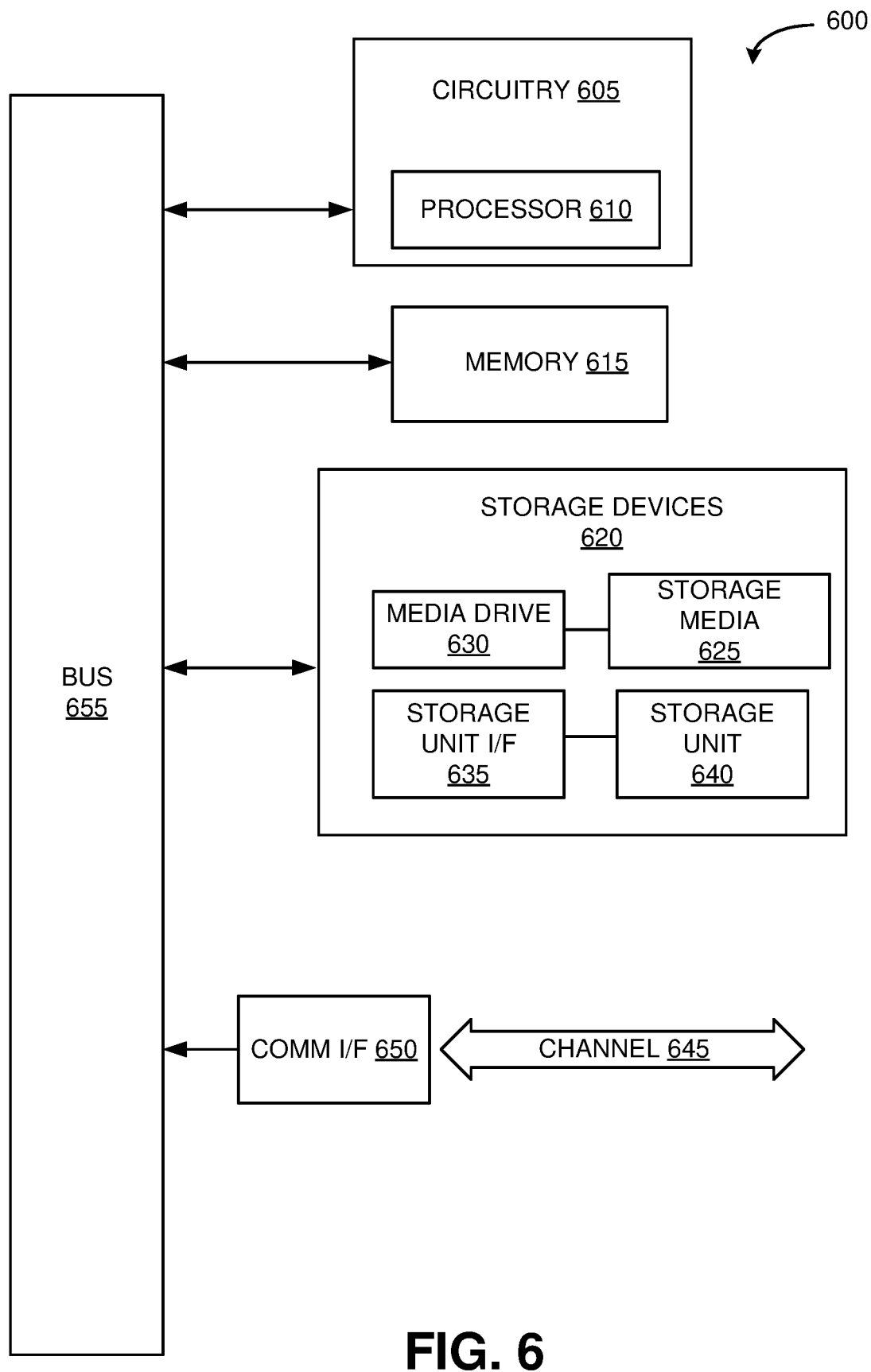
FIG. 6 illustrates an example computing component that may be used in implementing various features of the disclosed technology.

As used herein, the term component might describe a given unit of functionality that can be performed in accordance with one or more implementations, of the technology disclosed herein. As used herein, a component might be implemented utilizing any form of hardware, software, or a combination thereof. For example, a processor, controller, ASIC, PLA, PAL, CPLD, FPGA, logical component, software routine or other mechanism might be implemented to make up a component. In implementation, the various components described herein might be implemented as discrete components or the functions and features described can be shared in part or in total among components. In other words, as would be apparent to one of ordinary skill in the art after reading this description, the various features and functionality described herein may be implemented in any given application and can be implemented in separate or shared components in various combinations and permutations. Even though various features or elements of functionality may be individually described or claimed as separate components, one of ordinary skill in the art will understand that these features and functionality can be shared among common software and hardware elements, and such description shall not require or imply that separate hardware or software components are used to implement such features or functionality.

Where components of the technology are implemented in whole or in part using software, in one or more implementations, these software elements can be implemented to operate with a computing or processing component capable of carrying out the functionality described with respect thereto. One such example computing component is shown in FIG. 6. Various implementations are described in terms of this example-computing component 600. After reading this description, it will become apparent to a person skilled in the relevant art how to implement the technology using other computing components or architectures.

Referring now to FIG. 6, computing component 600 may represent, for example, computing or processing capabilities found within mainframes, supercomputers, workstations, or servers; desktop, laptop, notebook, or tablet computers; hand-held computing devices (tablets, PDA's, smartphones, cell phones, palmtops, and/or other hand-held computing devices); or the like, depending on the application and/or environment for which computing component 600 is specifically purposed.

Computing component 600 may include, for example, a processor, controller, control component, or other processing device, such as a processor 610, and such as may be included in circuitry 605. Processor 610 may be implemented using a special-purpose processing component such as, for example, a microprocessor, controller, or other control logic. In the illustrated example, processor 610 is connected to bus 655 by way of circuitry 605, although any communication medium may be used to facilitate interaction with other components of computing component 600 or to communicate externally.

Computing component 600 may also include a memory component, simply referred to herein as main memory 615. For example, random access memory (RAM) or other dynamic memory may be used for storing information and instructions to be executed by processor 610 or circuitry 605. Main memory 615 may also be used for storing temporary variables or other intermediate information during execution of instructions to be executed by processor 610 or circuitry 605. Computing component 600 may likewise include a read only memory (ROM) or other static storage device coupled to bus 655 for storing static information and instructions for processor 610 or circuitry 605.

Computing component 600 may also include various forms of information storage devices 620, which may include, for example, media drive 630 and storage unit interface 635. Media drive 630 may include a drive or other mechanism to support fixed or removable storage media 625. For example, a hard disk drive, a floppy disk drive, a magnetic tape drive, an optical disk drive, a CD or DVD drive (R or RW), or other removable or fixed media drive may be provided. Accordingly, removable storage media 625 may include, for example, a hard disk, a floppy disk, magnetic tape, cartridge, optical disk, a CD or DVD, or other fixed or removable medium that is read by, written to, or accessed by media drive 630. As these examples illustrate, removable storage media 625 may include a computer usable storage medium having stored therein computer software or data.

In alternative implementations, information storage devices 620 may include other similar instrumentalities for allowing computer programs or other instructions or data to be loaded into computing component 600. Such instrumentalities may include, for example, fixed or removable storage unit 640 and storage unit interface 635. Examples of such removable storage units 640 and storage unit interfaces 635 may include a program cartridge and cartridge interface, a removable memory (for example, a flash memory or other removable memory component) and memory slot, a PCM-CIA slot and card, and other fixed or removable storage units 640 and storage unit interfaces 635 that allow software and data to be transferred from removable storage unit 640 to computing component 600.

Computing component 600 may also include a communications interface 650. Communications interface 650 may be used to allow software and data to be transferred between computing component 600 and external devices. Examples of communications interface 650 include a modem or softmodem, a network interface (such as an Ethernet, network interface card, WiMedia, IEEE 502.XX, or other interface), a communications port (such as for example, a USB port, IR port, RS232 port Bluetooth® interface, or other port), or other communications interface. Software and data transferred via communications interface 650 may typically be carried on signals, which may be electronic, electromagnetic (which includes optical) or other signals capable of being exchanged by a given communications interface 650. These signals may be provided to/from communications interface 650 via channel 645. Channel 645 may carry signals and may be implemented using a wired or wireless communication medium. Some non-limiting examples of channel 645 include a phone line, a cellular or other radio link, a RF link, an optical link, a network interface, a local or wide area network, and other wired or wireless communications channels.

In this document, the terms "computer program medium" and "computer usable medium" are used to generally refer to transitory or non-transitory media such as, for example, main memory 615, storage unit interface 635, removable storage media 625, and channel 645. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component 600 or a processor to perform features or functions of the present application as discussed herein.

While various implementations, of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various implementations, be implemented to perform the recited functionality in the same order unless the context dictates otherwise.

Although the disclosed technology is described above in terms of various exemplary implementations, and implementations, it should be understood that the various features, aspects, and functionality described in one of the individual implementations, are not limited in their applicability to the particular implementation with which they are described, but instead can be applied, alone or in various combinations, to one of the other implementations, of the disclosed technology, whether or not such implementations, are described and whether or not such features are presented as being a part of a described implementation. Thus, the breadth and scope of the technology disclosed herein should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The presence of words such as "first," "second," "third," or other like words in some instances shall not be read to mean there can only be one, two or three elements; it should be appreciated that there may be more than one, two, or three elements used in the presently disclosed technology. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various implementations, set forth herein are described in terms of exemplary block diagrams, flow charts, and other illustrations. As will become apparent to one of ordinary skill in the art after reading this document, the illustrated implementations, and their various alternatives can be implemented without confinement to the illustrated examples. For example, block diagrams and their accompanying description should not be construed as mandating a particular architecture or configuration.

What is claimed is:

1. A computer-implemented method for identifying subsurface features as a function of position in a subsurface volume of interest, the method being implemented in a computer system that comprises a physical computer processor and a non-transitory storage medium, the method comprising:
obtaining, from the non-transitory storage medium, target subsurface data comprising a subsurface energy value;
obtaining, from the non-transitory storage medium, a conditioned subsurface feature model comprising a conditioned subsurface feature extraction sub-model, a conditioned subsurface object detection sub-model, and multiple conditioned network sub-models, the conditioned subsurface feature model having been generated by applying an initial subsurface feature model to training subsurface data and training subsurface feature data, wherein the training subsurface data comprises subsurface energy values, and wherein the training subsurface feature data comprises the training structural identification values defined by structural identification parameters and corresponding training categorization values defined by categorization parameters and one of the training structural identification values;
applying, with the physical computer processor, the conditioned subsurface feature model to the target subsurface data by:
generating, with the conditioned feature extraction sub-model, convoluted target subsurface data by convoluting the target subsurface data, wherein convoluting comprises applying a kernel to the target subsurface data to generate a matrix of dot products;
generating, with the conditioned feature extraction sub-model, target subsurface feature map layers by applying filters to the convoluted target subsurface data, wherein a given target subsurface feature map layer corresponds to a given spatial scale of the target subsurface data;
detecting, with the conditioned subsurface object detection sub-model, potential target subsurface features in the target subsurface feature map layers;
masking, with the conditioned subsurface object detection sub-model, the target subsurface features; and
estimating, with the multiple conditioned network sub-models, target subsurface feature data by linking the masked subsurface features to the target subsurface feature data.

2. The computer-implemented method of claim 1, wherein the computer system comprises a display, and wherein the computer-implemented method further comprises:
generating, with the physical computer processor, a representation of geological structures as a function of position in the subsurface volume of interest using visual effects to depict at least some of the target subsurface feature data; and
displaying the representation via the display.

3. The computer-implemented method of claim 1, wherein the target subsurface feature data comprises a target structural identification value defined by structural identification parameters and a corresponding target categorization value defined by categorization parameters and the target structural identification value.

4. The computer-implemented method of claim 3, wherein the target structural identification values indicate whether or not there is a subsurface feature.

5. The computer-implemented method of claim 3, wherein the target categorization values indicate one of a subsurface feature category and a subsurface feature subcategory.

6. The computer-implemented method of claim 1, wherein the conditioned subsurface feature model comprises an adversarial loss function defined by $$\min_{f_D, f_F} L_D(f_D(f_F(X)), Y_D) - w L_G(f_G(f_F(X)), Y_G)$$

where $f_D$ refers to the initial object detection sub-model, $f_F$ refers to the initial feature extraction sub-model, $Y_D$ refers to a ground truth for detection, $L_D$ refers to the cross-entropy loss, $f_G$ refers to the initial network sub-models, LG refers to the geometrical location classification loss, $Y_G$ refers to the ground truth of geometrical locations, and $w$ refers to a weight.

7. The computer-implemented method of claim 1, wherein the kernel is a weighted matrix moved over the target subsurface data to generate dot products over each region covered by the weighted matrix.

8. A computer-implemented method for training a subsurface feature model to identify subsurface features as a function of position in a subsurface volume of interest, the method being implemented in a computer system that comprises a physical computer processor and a non-transitory storage medium, the method comprising:
obtaining, from the non-transitory storage medium, training subsurface data comprising a subsurface energy value and corresponding training subsurface feature data, wherein the training subsurface feature data comprises a training structural identification value defined by structural identification parameters and a corresponding training categorization value defined by categorization parameters and the training structural identification value;
obtaining, from the non-transitory storage medium, an initial subsurface feature model comprising an adversarial loss function, wherein the initial subsurface feature model comprises an initial subsurface feature extraction sub-model, an initial subsurface object detection sub-model, and multiple initial network sub-models, wherein the adversarial loss function is based on a task related loss and a geometrical location classification loss;
generating, with the physical computer processor, a conditioned subsurface feature model by training the initial subsurface feature model using the training subsurface data, the training subsurface feature data, and the adversarial loss function, wherein the conditioned subsurface feature model comprises a conditioned subsurface feature extraction sub-model, a conditioned subsurface object detection sub-model, and multiple conditioned network sub-models; and
storing the conditioned subsurface feature model in the non-transitory storage medium.

9. The computer-implemented method of claim 8, further comprising:

obtaining, from the non-transitory storage medium, target subsurface data comprising a subsurface energy value;

applying, with the physical computer processor, the conditioned subsurface feature model to the target subsurface data by:

generating, with the conditioned feature extraction sub-model, target subsurface feature map layers by convoluting the target subsurface data, wherein a given target subsurface feature map layer corresponds to a given spatial scale of the target subsurface data;

detecting, with the conditioned subsurface object detection sub-model, potential target subsurface features in the target subsurface feature map layers;

classifying, with the conditioned subsurface object detection sub-model, the detected target subsurface features; and linking, with the multiple network sub-models, the classified subsurface features to the target subsurface feature data.

10. The computer-implemented method of claim 9, wherein the computer system comprises a display, and wherein the computer-implemented method further comprises:

generating, with the physical computer processor, a representation of geological structures as a function of position in the subsurface volume of interest using visual effects to depict at least some of the target subsurface feature data; and displaying the representation via the display.

11. The computer-implemented method of claim 10, wherein the target subsurface feature data comprises a target structural identification value defined by structural identification parameters and a corresponding target categorization value defined by categorization parameters and the target structural identification value.

12. The computer-implemented method of claim 11, wherein the target structural identification values indicate whether or not there is a subsurface feature.

13. The computer-implemented method of claim 11, wherein the target categorization values indicate one of a subsurface feature category and a subsurface feature sub-category.

14. The computer-implemented method of claim 8, wherein the adversarial loss function is $$\min_{f_D, f_F} L_D(f_D(f_F(X)), Y_D) - w L_G(f_G(f_F(X)), Y_G)$$

where $f_D$ refers to the initial object detection sub-model, $f_F$ refers to the initial feature extraction sub-model, $Y_D$ refers to a ground truth for detection, $L_D$ refers to a cross-entropy loss, $f_G$ refers to the initial network sub-models, $L_G$ refers to a geometrical location classification loss, $Y_G$ refers to a ground truth of geometrical locations, and $w$ refers to a weight.

15. A system for identifying subsurface features as a function of position in a subsurface volume of interest, the system comprising:

non-transitory storage medium; and a physical computer processor configured by machine readable instructions to:

obtain, from the non-transitory storage medium, target subsurface data comprising a subsurface energy value;

obtain, from the non-transitory storage medium, a conditioned subsurface feature model comprising a conditioned subsurface feature extraction sub-model, a conditioned subsurface object detection sub-model, and multiple conditioned network sub-models, the conditioned subsurface feature model having been generated by applying an initial subsurface feature model to training subsurface data and training subsurface feature data, wherein the training subsurface data comprises subsurface energy values, and wherein the training subsurface feature data comprises the training structural identification values defined by structural identification parameters and corresponding training categorization values defined by categorization parameters and one of the training structural identification values;

apply, with the physical computer processor, the conditioned subsurface feature model to the target subsurface data by:

generating, with the conditioned feature extraction sub-model, target subsurface feature map layers by convoluting the target subsurface data, wherein a given target subsurface feature map layer corresponds to a given spatial scale of the target subsurface data, wherein convoluting comprises applying a kernel to the target subsurface data to generate a matrix of dot products;

detecting, with the conditioned subsurface object detection sub-model, potential target subsurface features in the target subsurface feature map layers;

classifying, with the conditioned subsurface object detection sub-model, the detected target subsurface features; and linking, with the multiple network sub-models, the classified subsurface features to the target subsurface feature data.

16. The system of claim 15, wherein the system further comprises a display, and wherein the physical computer processor is further configured by machine readable instructions to:

generate, with the physical computer processor, a representation of geological structures as a function of position in the subsurface volume of interest using visual effects to depict at least some of the target subsurface feature data; and display the representation via the display.

17. The system of claim 15, wherein the subsurface feature model comprises one of a mask R-CNN network, a feature pyramids network, an object detection network, a neural network, a random forest model, a support vector machine, a regression, and a Bayesian network.

18. The system of claim 15, wherein the adversarial loss function is $$\min_{f_D, f_F} L_D(f_D(f_F(X)), Y_D) - w L_G(f_G(f_F(X)), Y_G)$$

where $f_D$ refers to the initial object detection sub-model, $f_F$ refers to the initial feature extraction sub-model, $Y_D$ refers to a ground truth for detection, $L_D$ refers to a cross-entropy loss, $f_G$ refers to the initial network sub-models, $L_G$ refers to a geometrical location classification loss, $Y_G$ refers to a ground truth of geometrical locations, and $w$ refers to a weight.

19. The system of claim 15, wherein the target subsurface feature data comprises a target structural identification value defined by structural identification parameters and a corresponding target categorization value defined by categorization parameters and the target structural identification value.

20. The system of claim 15, wherein convoluting the target subsurface data comprises applying a kernel to the target subsurface data, wherein the kernel is a weighted matrix moved over the target subsurface data to generate dot products over each region covered by the weighted matrix.

\* \* \* \* \*